United States Patent
Boland

(10) Patent No.: US 11,987,215 B2
(45) Date of Patent: May 21, 2024

(54) WINDSCREEN WIPER DEVICE OF THE FLAT BLADE TYPE

(71) Applicant: TRICO BELGIUM S.A., Aubange (BE)

(72) Inventor: Xavier Boland, Arlon (BE)

(73) Assignee: TRICO BELGIUM S.A., Aubange (BE)

( * ) Notice: Subject to any disclaimer, the term of this patent is extended or adjusted under 35 U.S.C. 154(b) by 284 days.

(21) Appl. No.: 17/606,739

(22) PCT Filed: Apr. 30, 2019

(86) PCT No.: PCT/EP2019/061112
§ 371 (c)(1),
(2) Date: Oct. 26, 2021

(87) PCT Pub. No.: WO2020/221446
PCT Pub. Date: Nov. 5, 2020

(65) Prior Publication Data
US 2022/0219648 A1  Jul. 14, 2022

(51) Int. Cl.
*B60S 1/38* (2006.01)
*B60S 1/40* (2006.01)
*B60S 1/52* (2006.01)

(52) U.S. Cl.
CPC ............ *B60S 1/4087* (2013.01); *B60S 1/522* (2013.01); *B60S 1/3862* (2013.01)

(58) Field of Classification Search
CPC ...... B60S 1/4083; B60S 1/522; B60S 1/4087; B60S 1/3862
See application file for complete search history.

(56) References Cited

U.S. PATENT DOCUMENTS

| | | | |
|---|---|---|---|
| 2017/0369036 A1* | 12/2017 | Houssat | B60S 1/40 |
| 2018/0105144 A1* | 4/2018 | Yee | B60S 1/4045 |
| 2018/0111588 A1* | 4/2018 | Jarasson | B60S 1/3862 |

FOREIGN PATENT DOCUMENTS

| | | |
|---|---|---|
| DE | 202018006068 | 3/2019 |
| EP | 0566470 | 10/1993 |
| WO | 2016119852 | 8/2016 |
| WO | 2019105647 | 6/2019 |

* cited by examiner

*Primary Examiner* — Michael D Jennings

(57) ABSTRACT

A windscreen wiper device of the flat blade type comprising an elastic, elongated carrier element, as well as an elongated wiper blade of a flexible material, which can be placed in abutment with a windscreen to be wiped, which wiper blade includes at least one longitudinal slit, in which slit at least one longitudinal strip of the carrier element is disposed, which windscreen wiper device comprises a connecting device for a rod-like extension of an oscillating arm, wherein said rod-like extension can be pivotally connected to said connecting device about a pivot axis near a free end thereof, with the special feature that said connecting device comprises a channel arranged to receive said free end of said rod-like extension, wherein said windscreen wiper device comprises a nozzle for spraying a washing liquid onto said windscreen to be wiped, wherein said nozzle is mounted onto said rod-like extension by sliding a ring-like mounting part of said nozzle over the free end of said rod-like extension in a direction away from said free end.

20 Claims, 4 Drawing Sheets

WINDSCREEN WIPER DEVICE OF THE FLAT BLADE TYPE

Figure 1A:
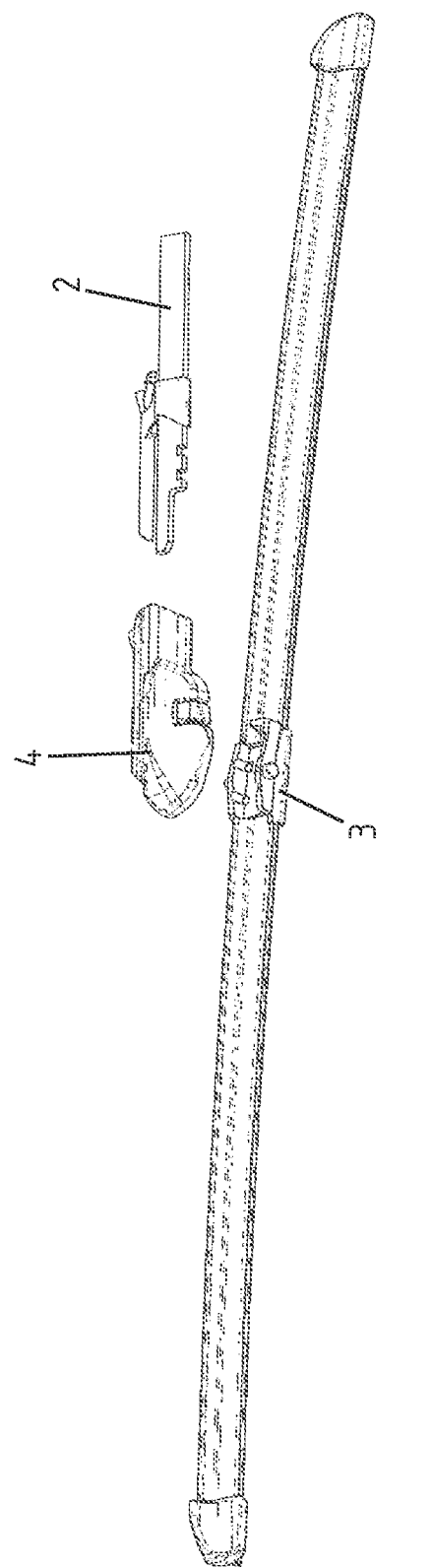

This application is a U.S. national stage entry of International Application Number PCT/EP2019/061112. International Application Number PCT/EP2019/061112 is incorporated herein by reference in its entirety.

The present invention relates to a windscreen wiper device of the flat blade type comprising an elastic, elongated carrier element, as well as an elongated wiper blade of a flexible material, which can be placed in abutment with a windscreen to be wiped, which wiper blade is connected to at least one longitudinal strip of the carrier element, which windscreen wiper device comprises a connecting device for a rod-like extension of an oscillating arm, wherein a rod-like extension can be pivotally connected to said connecting device about a pivot axis near one end thereof. Said longitudinal strip is also called a "flexor", while said connecting device is also indicated as a "connector". Often, said wiper blade includes at least one longitudinal slit, in which slit said longitudinal strip is disposed.

Preferably, said wiper blade comprises a spoiler at a side thereof facing away from the windscreen to be wiped. The spoiler is also called an "air deflector" and is preferably made in one piece with said wiper blade through extrusion. Said longitudinal slit is preferably a central longitudinal slit accommodating said longitudinal strip. Said connecting device is preferably fixedly connected to the longitudinal strip(s) particularly through a welding, brazing ("soldering"), gluing or clamping operation or with the help of a pin inserted through said connecting device and said longitudinal strip(s). In the alternative or in addition thereto, said connecting device is clamped onto the flexible material of the wiper blade, particularly in case the latter is equipped with a central longitudinal slit for the carrier element.

In use, said oscillating arm is connected to a mounting head mounted on a drive shaft, wherein said oscillating arm at one end thereof is pivotally connected to the mounting head by means of a pivot pin and at another end thereof is connected to said wiper blade placed in abutment with said windscreen to be wiped. In use, the shaft rotates alternately in a clockwise and in a counter-clockwise sense carrying the mounting head into rotation also, which in turn draws the oscillating arm into rotation and by means of said connecting device moves the wiper blade. Said oscillating arm can thus oscillate to-and-from between a first and second reversal positions.

The present invention also relates to a connecting device, as well as an oscillating arm with a rod-like extension arranged for use in such a windscreen wiper device.

It is noted that the present invention is not restricted to automobiles, but also refers to rail coaches and other (fast) vehicles.

A windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. A disadvantage of the known windscreen wiper device is that it is often used in combination with a nozzle fixedly mounted on (or below) a bonnet of a car for spraying a washing liquid onto the car's windscreen to be wiped. In practice it has become apparent that the windscreen cannot effectively be cleaned by a combination of the oscillating arm and the nozzle, as the nozzle emits the washing fluid thereon at a large distance relative to the windscreen, so that a relatively large amount of the washing fluid does not effectively reach a wiping pattern on the windscreen to be wiped. Further, it has become apparent that in the prior art a large amount of liquid (consumption) is required in an attempt to clean the windscreen to be wiped. Further, if the washing fluid is spread onto the car's body instead of onto the windscreen to be wiped, it may damage the car. Indeed, ethanol, methanol and other components of the washing fluid are believed to have a corrosive effect on paint, rubber, car wax and plastics, for example.

It is an object of the invention to provide an improved windscreen wiper device, wherein these disadvantages are obviated, in the sense that at minimum costs—without using complex machinery and additional tools—a simple oscillating arm (also called "windscreen wiper arm") is proposed to effectively clean a windscreen to be wiped, without damaging parts of a car, wherein less washing liquid is required to clean the windscreen to be wiped.

In order to accomplish that objective, a windscreen wiper device of the type referred to in the introduction is characterized according to the invention in that said connecting device comprises a channel arranged to receive said free end of said rod-like extension, wherein said windscreen wiper device comprises a nozzle for spraying a washing liquid onto said windscreen to be wiped, wherein said nozzle is mounted onto said rod-like extension by sliding a ring-like mounting part of said nozzle over the free end of said rod-like extension in a direction away from said free end (i.e. away from said wiper blade and toward a mounting head for said oscillating arm). Particularly, said ring-like mounting part comprises a closed ring. Hence, said nozzle is reliably and firmly locked onto said rod-like extension, wherein said closed ring is able to withstand forces along its closed circumference. Usually, said wiper blade includes at least one longitudinal slit, in which slit said longitudinal strip is disposed. In the alternative, said wiper blade and said longitudinal strip are glued together.

By connecting the nozzle directly to the rod-like extension of the oscillating arm, the nozzle is not only fixed to the rod-like extension in a reliable and controllable manner, although detachably in case of repair or replacement of the nozzle, but the nozzle is located at a very small distance relative to the windscreen to be wiped and is allowed to directly follow any oscillatory movement of the oscillating arm, so that the washing fluid exiting the nozzle can be effectively sprayed thereon, with all positive consequences involved as to effective cleaning of the windscreen to be wiped and safe visibility for a driver.

Further, the nozzle may be used as a first nozzle in combination with a second nozzle located on the oscillating arm for spraying a washing liquid onto the windscreen to be wiped. Hence, in that case the washing liquid is sprayed from at least two locations (on the rod-like extension and on the oscillating arm) onto the windscreen to be wiped, namely washing liquid exiting from the first nozzle connected to the rod-like extension, as well as washing liquid exiting from the second nozzle connected to the oscillating arm. Thus, the windscreen can be cleaned efficiently over a very large wiping area thereof, particularly at high speeds. In that case, the first and second nozzles are preferably connected to only one inlet for the washing fluid, so that the first and second nozzles are in liquid contact with each other.

In a preferred embodiment of a windscreen wiper device in accordance with the invention said connecting device blocks a longitudinal movement of said ring-like mounting part in a direction towards said free end (i.e. towards said wiper blade). Preferably, said rod-like extension extends in longitudinal direction and tapers towards its free end, such that a longitudinal movement of said ring-like mounting part in a direction away from said free end is blocked by said rod-like extension. Thus, a wider or thicker part of said rod-like extension blocks said movement. In addition thereto or in the alternative, a longitudinal movement of said ring-like mounting part in a direction away from said free is blocked by snapping a protrusion of said ring-like mounting part inside a hole in said rod-like extension or by snapping a protrusion of said rod-like extension inside a hole in said ring-like mounting part. Said hole preferably has a closed circumference.

In a further preferred embodiment of a windscreen wiper device according to the invention said connecting device comprises a channel arranged to receive said rod-like extension, said channel including a first chamber facing towards an entrance of said channel, as well as a second chamber facing away from said entrance, said first chamber having a larger width than said second chamber, wherein said first chamber is arranged to receive a first part of said rod-like extension, and wherein said second chamber is arranged to receive a second part of said rod-like extension, said first part of said rod-like extension having a larger width than said second part of said rod-like extension. In other words, the free end of said rod-like extension has a cut-out in order to form the two parts therein, wherein the first part is wider than the second part. The second part forms a longitudinally extending finger to be accommodated in the correspondingly shaped second chamber of the channel. The wider first part is to be accommodated in the correspondingly shaped first chamber of the channel Due to the cut-out there is a larger guiding surface in the connecting device to guide the rod-like extension inside said channel in a reliable yet controlled manner Preferably, said first and second chambers of the channel have a closed circumference to enhance retention of the rod-like extension therein.

In a further preferred embodiment of a windscreen wiper device in accordance with the invention said channel is arranged to receive two types of said rod-like extension, said types mutually differing in width of said first and second parts thereof, respectively. In other words, the first part of the first type rod-like extension is wider than the first part of the second type rod-like extension, while the second part of the first type rod-like extension is wider than the second part of the second type rod-like extension. Said channel is arranged to accommodate both types of rod-like extension. In the alternative, if said connecting device comprises a first part and a second part as claimed in claim 9, said second part acting acts a joint part and differs for each type of rod-like extension. Hence, the first part is a universal part, whereas there are two types of second part corresponding to the two types of rod-like extensions.

In a further preferred embodiment of a windscreen wiper device according to the invention said connecting device comprises a sidewardly and inwardly extending protrusion arranged to engage into a first recess provided on a longitudinal exterior side of said rod-like extension, wherein said connecting device comprises a resilient tongue arranged to engage into a second recess provided on said longitudinal exterior side of said rod-like extension, and wherein said resilient tongue is hingeable along a hinge axis between an inward position retaining said wiper blade onto said rod-like extension and an outward position releasing said wiper blade from said rod-like extension. Particularly, said channel has a closed circumference. More in particular, said channel is formed by a blind hole having a closed circumference. The resilient tongue cooperating with the second recess on the one hand and the protrusion cooperating with the first recess on the other hand form first and second retention means, respectively, for retaining the wiper blade onto the oscillating arm. Said first and second retention means can be used independently from one another, i.e. the first retention means can be used without the second retention means and the second retention means can be used without the first retention means.

Preferably, said channel has a length and a width, wherein a plane extending in a direction of the width of said channel and a plane extending through said longitudinal strip along a width thereof at the location of the connecting device enclose an angle $\alpha$, wherein preferably $15°<\alpha<60°$. In other words, in a transverse or cross-section of the windscreen wiper device, a centre line of the cross-sectional plane of said channel encloses the angle $\alpha$ with a symmetry axis of said longitudinal groove. Because of the angle $\alpha$ less pressure by the oscillating arm on the wiper blade is necessary to maintain high velocity wiping performances.

In the framework of the present invention said oscillating arm is equipped with said rod-like extension preferably having a rectangular cross-section, wherein said extension is to be inserted in the channel of the connecting device, and wherein said extension has a twisted orientation relative to the oscillating arm preferably having a U-shaped cross-section. Such a twisted arm extension has proven to considerably improve an air flow, to considerably reduce a height of the windscreen wiper device, whereas its design is attractive from a commercial perspective. Said channel preferably having a rectangular cross-section as well, has a twisted orientation corresponding to the twisted orientation of the arm extension in order to accommodate said arm extension during use. In other words, a bottom of said channel does not extend parallel to a windscreen to be wiped (when the oscillating arm in one of said reversal positions is in a central region of the windscreen to be wiped and disregarding any small curvature thereof in that region), but said bottom and said windscreen to be wiped enclose said angle $\alpha$ in that region.

It is noted that the present invention is not restricted to the use of only one longitudinal strip forming the elastic carrier element that is particularly located in a central longitudinal groove of the wiper blade. Instead, said carrier element may also comprise two longitudinal strips, wherein said strips are disposed in opposite longitudinal grooves of the wiper blade. Said groove(s) may be closed at one outer end.

In a further preferred embodiment of a windscreen wiper device in accordance with the invention said protrusion is dimensioned such that
  in a working position of said wiper blade pivoted relative to said rod-like extension, said protrusion engages into said first recess thus retaining said wiper blade onto said rod-like extension;
  in a service position of said wiper blade pivoted relative to said rod-like extension, said protrusion disengages from said first recess thus releasing said wiper blade from said rod-like extension.

In a further preferred embodiment of a windscreen wiper device according to the invention said first and second recesses have an open circumference and are spaced-apart in longitudinal direction.

In a further preferred embodiment of a windscreen wiper device in accordance with the invention said resilient tongue is hingeable from said inward position into said outward position by a push button, wherein said push button forms a part of an outer wall of said connecting device. Particularly, said push button is located near a free end of said connecting device facing towards said rod-like extension.

In a further preferred embodiment of a windscreen wiper device according to the invention said connecting device comprises a first part and a second part, wherein said rod-like extension of said oscillating arm can be pivotally connected to said first part about said pivot axis, with the interposition of said second part, wherein said second part comprises said channel, and wherein said first part is connected to said wiper blade and said second part is detachably connected to said first part. Preferably, said first and said second parts are each made in one piece of plastic material.

In a further preferred embodiment of a windscreen wiper device in accordance with the invention said first part and said second part are provided with mutually cooperating pivot means for pivotally connecting said second part to said first part. Particularly, said second part is connected to said first part by pivotally engaging protuberances of said first part, at the location of said pivot axis, in recesses provided in said second part. More in particular, said second part is detachably connected to said first part through a snapping/clipping operation.

In a further preferred embodiment of a windscreen wiper device according to the invention said first part comprises a flat base having legs integral therewith engaging around longitudinal sides of the wiper blade, at the location of a longitudinal slit for said longitudinal strip of said carrier element. Preferably, said first part comprises two opposite side walls extending in upright direction from said base, and wherein one of said side walls comprises said sidewardly and inwardly extending protrusion. More preferably, said pivotally engaging protuberances of said first part are provided outwardly on said opposite side walls, and wherein said recesses are provided inwardly in opposite walls of said second part. Said protuberances are particularly mutually spaced far apart, so as to reduce angular play and to reduce wear.

In a further preferred embodiment of a windscreen wiper device in accordance with the invention said side walls of said first part are entirely located inside said second part in a working position of said wiper blade.

Figure 1B:
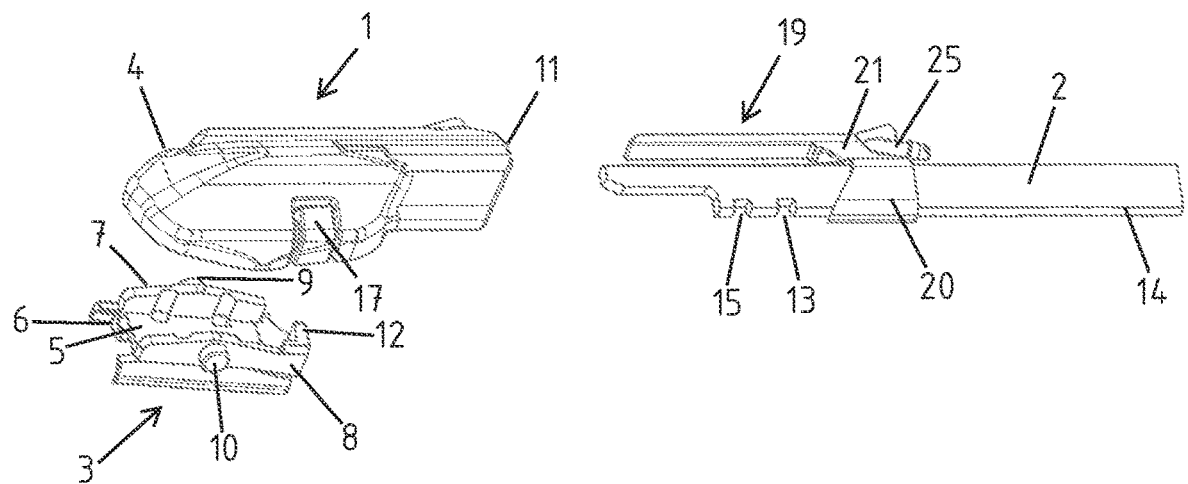
Figure 1B:
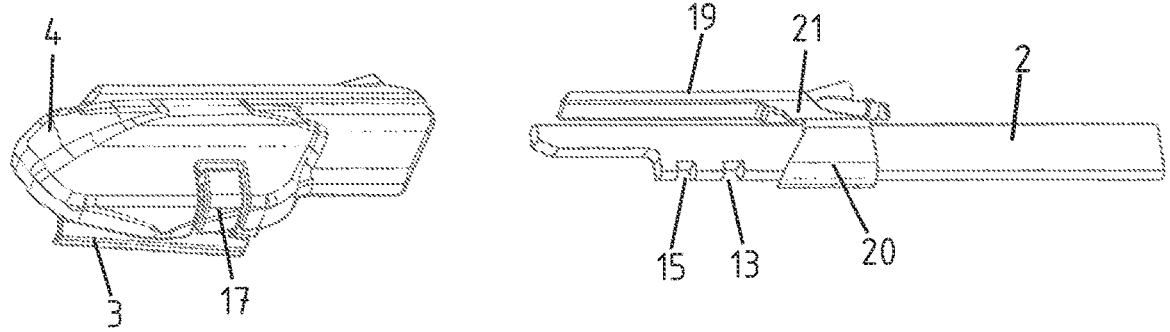
Figure 1B:
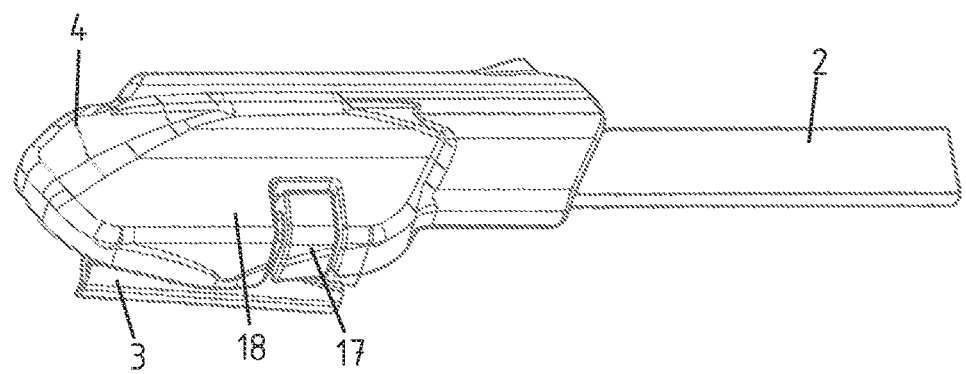
Figure 1C:
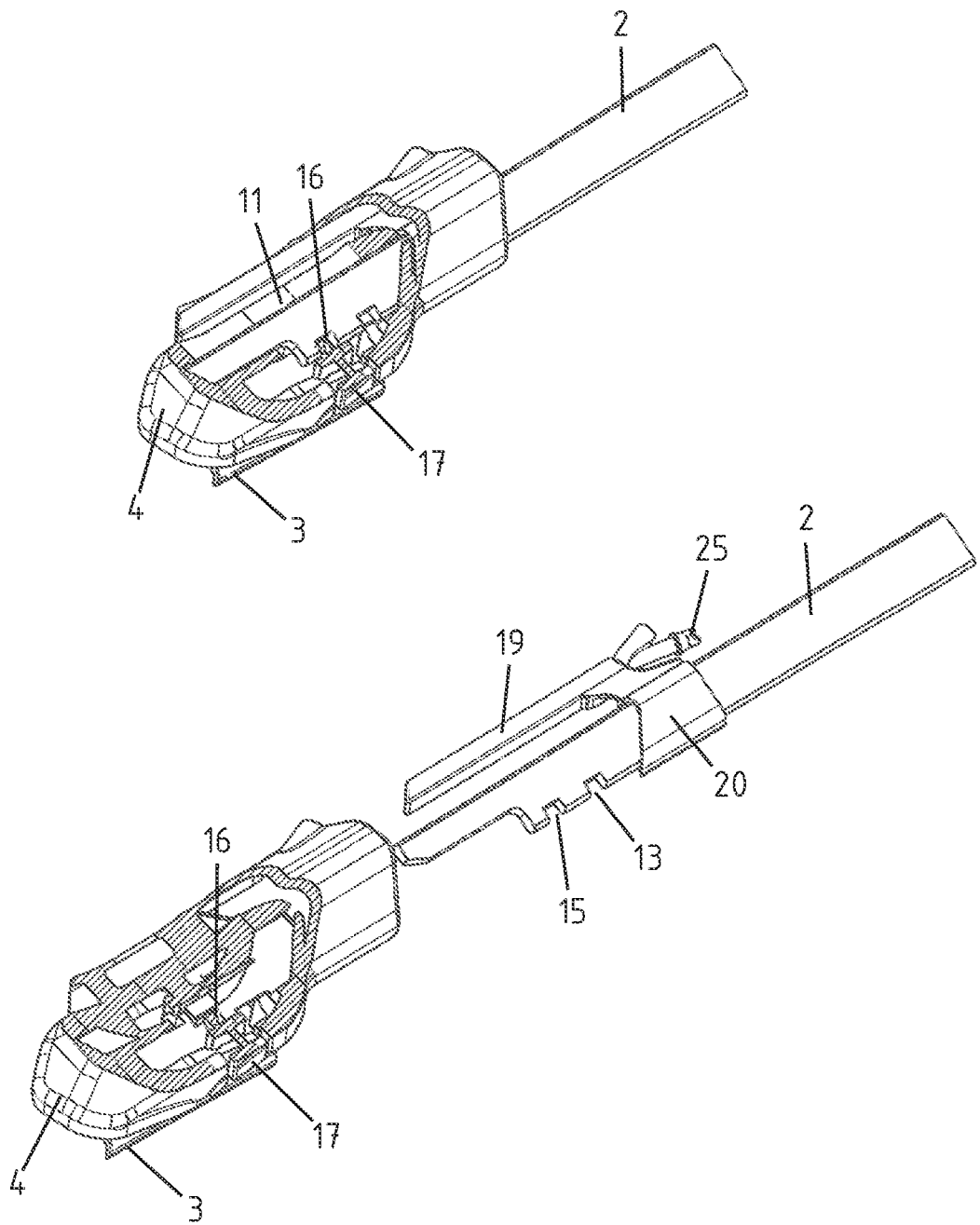
Figure 2:
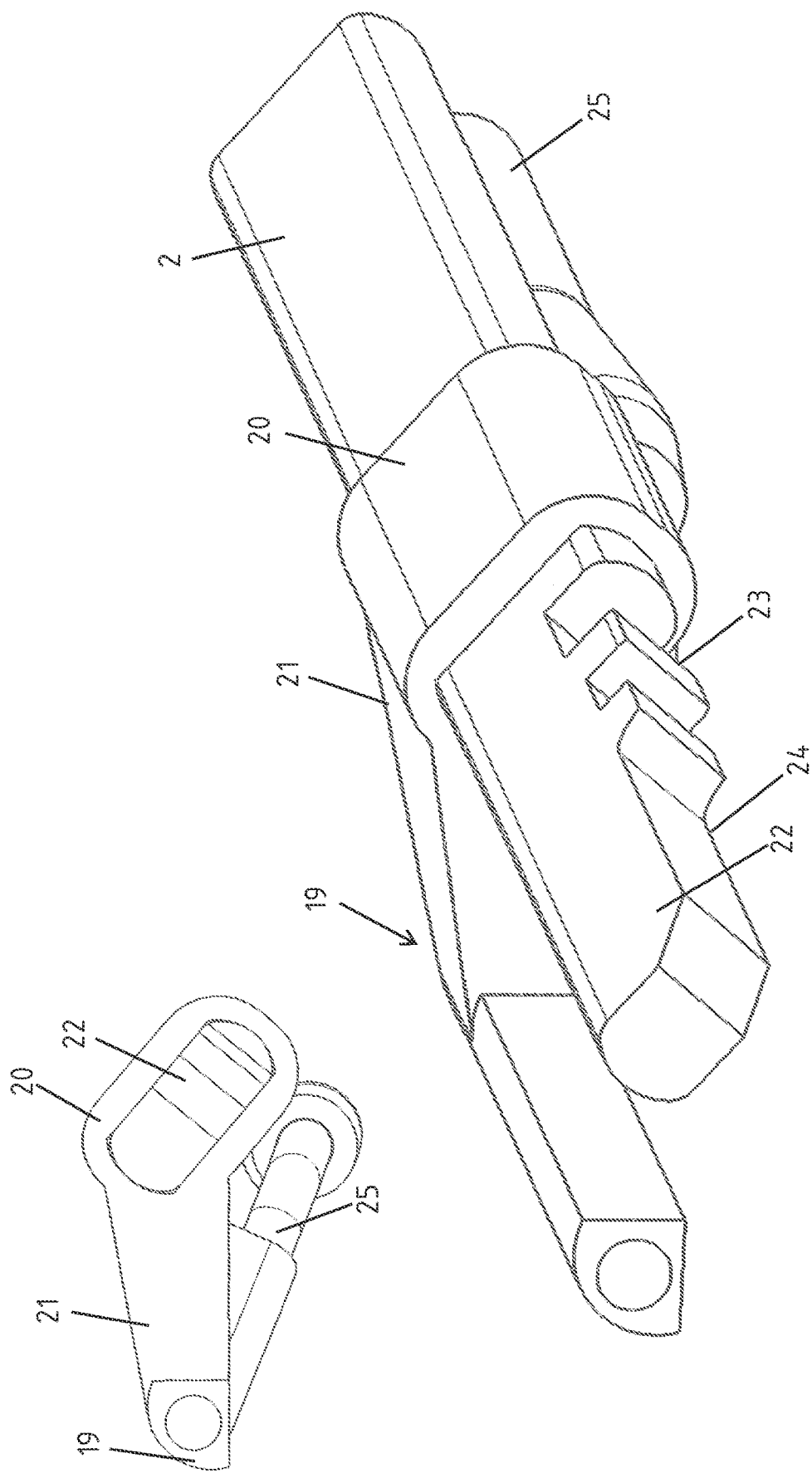

The invention will now be explained in more detail with reference to figures illustrated in a drawing, wherein:

FIGS. 1A-1C show in perspective details of a windscreen wiper device of the flat blade type according to the invention, wherein successive steps are shown for fitting an windscreen wiper arm with a nozzle to a connecting device of a wiper blade; and FIG. 2 shows in perspective and partly in cross-section the windscreen wiper arm and the nozzle of FIGS. 1A-1C in assembled and disassembled position.

FIGS. 1A-1C refer to a windscreen wiper device of the flat blade type built up of a wiper blade, in the longitudinal sides of which opposing longitudinal slits are formed, and of longitudinal strips ("flexors") made of spring band steel, which are fitted in said longitudinal slits. Said strips form a flexible carrier element for the rubber wiper blade, as it were, which is thus biased in a curved position (the curvature in operative position being that of a windscreen to be wiped). As shown in FIGS. 1A-1C, the windscreen wiper device is furthermore built up of a connecting device 1 of plastic material for a rod-like extension 2 of a windscreen wiper arm. Said connecting device 1 comprises a first part 3 and a second part 4 acting as a joint part, wherein said rod-like extension 2 arm can be pivotally connected to said first part 3 about said pivot axis, with the interposition of said second part 4. Said first part 3 comprises a flat base 5 having inwardly extending legs 6 integral therewith engaging around longitudinal sides of the wiper blade, at the location of said grooves, as a result of which the first part 1 is firmly attached to the unit consisting of the wiper blade and the strips. Said first part 3 comprises two opposite side walls 7,8 extending in upright direction from said flat base 5. On said opposite side walls 7,8 are formed cylindrical protuberances 9,10 extending outwardly. These protuberances 9,10 pivotally engage, at the location of said pivot axis, in identically shaped recesses provided in opposite walls of the second part 4. Hence, said second part 4 is detachably connected to said first part 3 through a snapping/clipping operation. As shown in FIG. 2 above, said side walls 7,8 of said first part 3 are entirely located inside said second part 4 in a working position of said wiper blade.

With reference to FIGS. 1A-1C said second part 4 comprises a channel 11 arranged to receive (in a linear movement) said rod-like extension 2 of said oscillating arm. As shown, said channel 11 has a length and a width, and wherein a plane extending in a direction of the width of said channel and a plane extending through said longitudinal strip along a width thereof at the location of the connecting device enclose an angle $\alpha=30°$.

One of said side walls 8 of said first part 3 comprises a protrusion 12 extending sidewards and inwards and arranged to engage into a first recess 13 having an open circumference and provided on a longitudinal exterior side 14 of said rod-like extension 2. For mounting or dismounting the connecting device 1 from the rod-like extension the second part 4 (and thus the free end of the rod-like extension 2 connected thereto), is pivoted relative to the first part 3, wherein reference is made to FIGS. 1A-1C. As far as dismounting is concerned, while carrying out the pivot movement, the protrusion or cam 12 is no longer in line with the first recess 13, so that the second part 4 and the first part 3 attached thereto can be released from the rod-like extension 2. As far as mounting is concerned, while carrying out the pivot movement, the protrusion or cam 12 becomes in line with the first recess 13, so that the second part 4 and the first part 3 attached thereto is retained onto the rod-like extension 2. The mutually cooperating protrusion 12 and recess 13 act as second retention means in case first retention means, as explained below, would inadvertently fail.

The rod-like extension 2 is also provided with a second recess 15 also having an open circumference and also provided on the same longitudinal exterior side 14 of said rod-like extension 2. As shown, said first and second recesses 13,15 have an open circumference and are spaced-apart in longitudinal direction. Said second recess 15 cooperates with a resilient tongue 16 on the second part 4 arranged to engage into a second recess 15, together acting as first retention means in this case. Said resilient tongue 16 is hingeable along a hinge axis between an inward position retaining said second part 4 (together with the first part 3 and the wiper blade attached thereon) onto said rod-like extension 2 and an outward position releasing second part 4 (together with the first part 3 and the wiper blade attached thereon) from said rod-like extension 2. Said resilient tongue is hingeable (i.e. activated and deactivated) from said inward position into said outward position by a push button 17. Said push button 17 forms a part of an outer wall 18 of said second part 4 and is located near a free end of said second part 4 facing towards said rod-like extension 2.

As depicted in FIG. 2, said windscreen wiper device comprises a nozzle 19 for spraying a washing liquid onto a windscreen to be wiped. Said nozzle 19 is mounted onto said rod-like extension 2 by sliding a closed ring 20 of a ring-like mounting part 21 of said nozzle 19 over the free end 22 of said rod-like extension 2 in a direction away from said free end 22, i.e. away from said wiper blade and towards a mounting head of said oscillating arm. Said connecting device 1 blocks a longitudinal movement of said ring-like mounting part 21 in a direction towards said free end 22 (i.e. towards said wiper blade). As shown, said rod-like extension 2 extends in longitudinal direction, i.e. extends and narrows in width towards its free end, so that a longitudinal movement of said ring-like mounting part 21 in a direction away from said wiper blade is blocked by a part of said rod-like extension 21 having a larger width than said ring-like mounting part. Not shown, said channel 11 includes a first chamber facing towards an entrance of said channel 11, as well as a second chamber facing away from said entrance, said first chamber having a larger width than said second chamber. Said first chamber is arranged to receive a first part 23 of said rod-like extension 2, wherein said second chamber is arranged to receive a second part 24 of said rod-like extension 2, said first part 23 of said rod-like extension 2 having a larger width than said second part 24 of said rod-like extension 2. The nozzle 19 is connected to a liquid pipe 25.

The invention is not restricted to the preferred embodiments shown in the figures, but extends also to other preferred variants within the scope of the appended claims.

The invention claimed is:

1. A windscreen wiper device of the flat blade type comprising an elastic, elongated carrier element, as well as an elongated wiper blade of a flexible material, which can be placed in abutment with a windscreen to be wiped, which wiper blade is connected to at least one longitudinal strip of the carrier element is, which windscreen wiper device comprises a connecting device for an extension of an oscillating arm, wherein said extension can be pivotally connected to said connecting device about a pivot axis near a free end thereof, said connecting device comprises a channel arranged to receive said free end of said extension, wherein said windscreen wiper device comprises a nozzle for spraying a washing liquid onto said windscreen to be wiped, wherein said nozzle is mounted onto said extension by sliding a ring-like mounting part of said nozzle over the free end of said extension in a direction away from said free end wherein a longitudinal movement of said ring-like mounting part in a direction away from said free is blocked by snapping a protrusion of said ring-like mounting part inside a hole in said extension or by snapping a protrusion of said extension inside a hole in said ring-like mounting part.

2. The windscreen wiper device according to claim 1, wherein said ring-like mounting part comprises a closed ring.

3. The windscreen wiper device according to claim 1, wherein said connecting device blocks a longitudinal movement of said ring-like mounting part in a direction towards said free end.

4. The windscreen wiper device according to claim 1, wherein said extension extends in longitudinal direction and tapers towards its free end, such that a longitudinal movement of said ring-like mounting part in a direction away from said free is blocked by said extension.

5. The windscreen wiper device according to claim 1, wherein said channel includes a first chamber facing towards an entrance of said channel, as well as a second chamber facing away from said entrance, said first chamber having a larger width than said second chamber, wherein said first chamber is arranged to receive a first part of said free end of said extension, and wherein said second chamber is arranged to receive a second part of said free end of said extension, said first part of said rod like extension having a larger thickness than said second part of said extension.

6. The windscreen wiper device according to claim 5, wherein said channel is arranged to receive two types of said extension, said types mutually differing in width of said first and second parts thereof, said first and said second parts are each made in one piece of plastic material.

7. The windscreen wiper device according to claim 6, wherein said connecting device comprises a sidewardly and inwardly extending protrusion arranged to engage into a first recess provided on a longitudinal exterior side of said extension, wherein said connecting device comprises a resilient tongue arranged to engage into a second recess provided on said longitudinal exterior side of said extension, and wherein said resilient tongue is hingeable along a hinge axis between an inward position retaining said wiper blade onto said extension and an outward position releasing said wiper blade from said extension.

8. The windscreen wiper device according to claim 7, wherein said protrusion is dimensioned such that
in a working position of said wiper blade pivoted relative to said extension, said protrusion engages into said first recess thus retaining said wiper blade onto said extension;
in a service position of said wiper blade pivoted relative to said extension, said protrusion disengages from said first recess thus releasing said wiper blade from said extension.

9. The windscreen wiper device according to claim 7, wherein said first and second recesses have an open circumference and are spaced-apart in longitudinal direction.

10. The windscreen wiper device according to claim 7, wherein said resilient tongue is hingeable from said inward position into said outward position by a push button, wherein said push button forms a part of an outer wall of said connecting device.

11. The windscreen wiper device according to claim 10, wherein said push button is located near a free end of said connecting device facing towards said extension.

12. The windscreen wiper device according to claim 1, wherein said channel has a length and a width, and wherein a plane extending in a direction of the width of said channel and a plane extending through said longitudinal strip along a width thereof at a location of the connecting device enclose an angle a, wherein preferably $15°<a<60°$.

13. The windscreen wiper device according to a claim 1, wherein said connecting device comprises a first part and a second part, wherein said extension of said oscillating arm can be pivotally connected to said first part about said pivot axis, with the interposition of said second part, wherein said second part comprises said channel, and wherein said first part is connected to said wiper blade and said second part is detachably connected to said first part.

14. The windscreen wiper device according to claim 13, wherein said first part and said second part are provided with mutually cooperating pivot means for pivotally connecting said second part to said first part.

15. The windscreen wiper device according to claim 14, wherein said second part is connected to said first part by pivotally engaging protuberances of said first part, at a location of said pivot axis, in recesses provided in said second part.

16. The windscreen wiper device according to claim 13, wherein said second part is detachably connected to said first part through a snapping/clipping operation, said windscreen wiper device further including a connection device and an oscillating arm with a extension.

17. The windscreen wiper device according to claim 13, wherein 30 said first part comprises a flat base having legs integral therewith engaging around longitudinal sides of the wiper blade, at a location of a longitudinal slit for said longitudinal strip of said carrier element.

18. The windscreen wiper device according to claim 17, wherein said first part comprises two opposite side walls extending in upright direction from said base, and wherein one of said side walls comprises said sidewardly and inwardly extending protrusion.

19. The windscreen wiper device according to claim 18, wherein said pivotally engaging protuberances of said first part are provided outwardly on said opposite side walls, and wherein said recesses are provided inwardly in opposite walls of said second part, said side walls of said first part are entirely located inside said second part in a working position of said wiper blade.

20. A windscreen wiper device of the flat blade type comprising:

an elastic elongated carrier element;

an elongated wiper blade of a flexible material in abutment with a windscreen to be wiped, the wiper blade being connected to at least one longitudinal strip of the carrier element;

a connecting device having a first part and a second part, the second part defining a channel therein;

an extension of an oscillating arm pivotally connected to the connecting device about a pivot axis near a free end of the extension;

a nozzle for spraying a washing liquid onto the windscreen to be wiped, wherein said nozzle is mounted onto the extension; and a mounting part of the nozzle operable to slide over the free end of the extension in a direction away from the free end;

wherein the extension of the oscillating arm is pivotally connected to the first part of the connecting device about the pivot axis with the interposition of the second part of the connecting device and wherein the first part of the connecting device is connected to the wiper blade and the second part of the connecting device is detachably connected to the first part of the connecting device.

* * * * *